Patented June 19, 1928.

1,674,589

UNITED STATES PATENT OFFICE.

WILLIAM AUGUSTUS CASPARI, OF LONDON, ENGLAND.

MANUFACTURE AND PRODUCTION OF OXYGENATED PRODUCTS FROM HYDROCARBONS OR OXIDIZABLE DERIVATIVES OF HYDROCARBONS.

No Drawing. Application filed November 6, 1926, Serial No. 146,852, and in Great Britain November 11, 1925.

This invention relates to the air oxidation of hydrocarbons or derivatives of hydrocarbons having a low oxygen content, such as alcohols and aldehydes, in the vapour state by the aid of a catalyst of an oxide or oxides of metals of the 5th, 6th, or higher groups such as vanadium oxide or the oxides of other heavy metals such as molybdenum, tungsten, chromium and uranium, for the production of oxygenated or more highly oxygenated products such as acids, anhydrides, aldehydes and quinones.

Hitherto in such manufacture it has been proposed to cause the starting materials in the form of vapour mixed with an oxygen-containing gas to be passed over or through the catalyst which is in a fixed condition, such catalyst being an oxide of one of the above-named metals.

According to the present invention a solution or suspension, whether colloidal or otherwise, of the catalyst aforesaid in the selected hydrocarbon or derivatives thereof as aforesaid, in the liquid state, is first prepared.

A spray of this solution in which air and atomized liquid are present in suitable proportions is passed through a heating chamber raised to a temperature varying from 200° to 400° centigrade, where the spray is vapourized and oxidation takes place. The heating chamber may also contain some of the catalyst in a fixed condition. The product obtained is condensed in the liquid or solid form while the catalyst is recovered in a finely divided state by being recondensed with the product.

During the process of the heating, which may take place in a pre-heating chamber at a temperature below the catalyzing temperature, e. g., at 150° centigrade in the case of toluene, or in the heating or catalyzing chamber itself, the hydrocarbon or oxidizable substance passed into the state of vapour, whilst the catalyst takes the form of aerosol in which the finely divided catalyst is in the solid state.

The following examples will further shew how the invention may be carried out in practice but the invention is not limited to these examples.

Example 1.

For the production of benzaldehyde and benzoic acid from toluene, a colloidal solution or suspension of vanadium oxide in toluene is first prepared and a spray of this solution in which the volume ratio of toluene vapour to air is approximately 1 to 8 is passed through the heating chamber raised to a temperature of from 200° to 300° centigrade when oxidation takes place. The benzaldehyde and benzoic acid formed are then condensed together with the greater part of the catalyst which is recovered substantially unchanged, or in the form of a lower oxide. So also maleic acid may be prepared by the catalytic oxidation of benzene.

Example 2.

For the production of phthalic anhydride from naphthalene, a colloidal solution or suspension of vanadium oxide is first prepared in molten naphthalene, and a spray of this solution, in which the volume ratio of naphthalene vapour to air is approximately 1 to 25, is passed through the heating chamber raised to a temperature of from 200° to 300° centigrade when oxidation takes place. The phthalic anhydride formed which may contain a small proportion of naphthoquinone is condensed as a sublimate together with the greater part of the catalyst which is recovered substantially unchanged or in the form of a lower oxide.

The process according to this invention gives highly satisfactory yields of the desired product as the catalyst is in a very finely divided state and evenly dispersed; the catalyst is recovered substantially unchanged and is available for repeated use after condensation of the products and separation therefrom.

What I claim is:—

1. In a process for the production of oxygenated products from volatile organic substances in the vapor state the use of a catalyst suspended in a finely divided condition in the reacting vapors.

2. In the production of oxygenated products from volatile organic substances, the use of a catalyst with a portion of the catalyst in a fixed condition in the heating chamber in combination with the remainder of the catalyst suspended in a finely divided condition in the reacting vapors.

3. The preparation of a catalyst for the process claimed in claim 1 in a state of aerosol by vapourizing in a heating chamber a spray consisting of a colloidal suspension, of the catalyst in the liquid raw material substantially as hereinbefore described.

4. In a process for the production of benzaldehyde from toluene, the steps of preparing a colloidal solution of vanadium oxide in toulene, and passing a spray of said solution through a heating chamber.

5. A process for the production of benzaldehyde and benzoic acid from toluene, comprising preparing a colloidal solution of vanadium oxide in toluene, passing a spray of said solution through a heating chamber, in contact with air condensing the heated products, and recovering the vanadium compound substantially as described.

In testimony whereof I have signed my name to this specification.

WILLIAM AUGUSTUS CASPARI.